United States Patent
Ido et al.

(10) Patent No.: US 9,506,807 B2
(45) Date of Patent: Nov. 29, 2016

(54) OPTICAL GAS TEMPERATURE SENSOR

(71) Applicant: HORIBA, Ltd., Kyoto-shi, Kyoto (JP)

(72) Inventors: Takuya Ido, Kyoto (JP); Tatsuya Mori, Kyoto (JP)

(73) Assignee: HORIBA, Ltd., Kyoto-shi (JP)

( * ) Notice: Subject to any disclaimer, the term of this patent is extended or adjusted under 35 U.S.C. 154(b) by 208 days.

(21) Appl. No.: 14/221,020

(22) Filed: Mar. 20, 2014

(65) Prior Publication Data

US 2014/0286376 A1 Sep. 25, 2014

(30) Foreign Application Priority Data

Mar. 21, 2013 (JP) ................. 2013-058416

(51) Int. Cl.
*G01J 5/00* (2006.01)
*G01J 5/48* (2006.01)
*G01J 5/08* (2006.01)
*G01J 5/04* (2006.01)
*G01J 5/02* (2006.01)
*G01J 5/58* (2006.01)
*G01J 5/60* (2006.01)

(52) U.S. Cl.
CPC ............ *G01J 5/0806* (2013.01); *G01J 5/0014* (2013.01); *G01J 5/029* (2013.01); *G01J 5/042* (2013.01); *G01J 5/084* (2013.01); *G01J 5/0896* (2013.01); *G01J 5/58* (2013.01); *G01J 5/602* (2013.01)

(58) Field of Classification Search
USPC .................. 374/130, 159, 160, 161
See application file for complete search history.

(56) References Cited

U.S. PATENT DOCUMENTS

| 3,909,132 | A | * | 9/1975 | Barrett | .............. | G01J 5/601 356/301 |
|---|---|---|---|---|---|---|
| 5,781,306 | A | | 7/1998 | Hartig et al. | | |
| 6,678,541 | B1 | | 1/2004 | Durkin et al. | | |
| 8,050,884 | B2 | * | 11/2011 | Murata | .............. | G01J 5/0003 356/43 |
| 2002/0001333 | A1 | * | 1/2002 | Glasheen | .............. | G01J 5/0014 374/131 |
| 2010/0285523 | A1 | * | 11/2010 | Pinsky | .............. | A01J 5/0135 435/39 |
| 2011/0150035 | A1 | * | 6/2011 | Hanson | .............. | G01K 11/12 374/161 |

FOREIGN PATENT DOCUMENTS

JP  2000074830 A  3/2000

OTHER PUBLICATIONS

ISA European Patent Office, Extended Search Report of EP14001026, Jul. 23, 2014, Germany, 6 pages.

* cited by examiner

*Primary Examiner* — Lisa Caputo
*Assistant Examiner* — Nasir U Ahmed
(74) *Attorney, Agent, or Firm* — Alleman Hall McCoy Russell & Tuttle LLP (57) ABSTRACT

A thermometer comprises an emitting unit, a light receiving unit, a light collecting unit, and a calculation unit. The emitting unit is configured to emit a measurement light into a flue, wherethrough a gas that contains light scattering particles flows. The light receiving unit is configured to receive, of the measurement light, scattered measurement light scattered by the light scattering particles. The light collecting unit is configured to collect the scattered measurement light existing on the light receiving axis. The calculation unit is configured to calculate the temperature inside the flue based on an intensity ratio of absorption spectra at a plurality of wavelengths.

6 Claims, 9 Drawing Sheets

OPTICAL GAS TEMPERATURE SENSOR

The present invention relates to a thermometer that measures the temperature inside a flue based on light absorption of a gas flowing through the flue.

DESCRIPTION OF THE RELATED ART

An apparatus is known (e.g., refer to Patent Document 1) that, based on an absorption spectrum of a prescribed component in an exhaust gas, measures the temperature of the exhaust gas flowing through a flue of, for example, a factory or an incinerating apparatus.

In the measurement system described in Patent Document 1, incident light from a semiconductor laser impinges on a gas inside a cell, and transmitted light that transmits through the cell is received by a light receiving device. At this time, the gas inside the cell absorbs light in a specific wavelength band. Based on the presence of an absorption line in the wavelength band, the spectral profile of the transmitted light (i.e., the absorption of light by the gas) is measured via the performance of a wavelength sweep of the laser light of the semiconductor laser.

In the measurement system described in Patent Document 1, two absorption lines are measured via the performance of a sweep of the oscillation wavelengths of the semiconductor laser for two different wavelengths of light that are absorbed by the gas inside the cell, and the temperature of the gas inside the cell is measured via the derivation of the ratio of the areas (or the ratio of the peak heights) of those two absorption lines.

CITATION LIST

Patent Literature

Patent Citation 1: Japanese Unexamined Patent Application Publication No. 2000-74830

SUMMARY OF THE INVENTION

Technical Problem

If the measurement system described in Patent Document 1 is used when the temperature inside a flue is being measured, it is necessary to provide a light receiving device on a sidewall of the flue opposite the sidewall of the flue whereto the semiconductor laser is provided, the flue being interposed between the sidewalls (a measuring apparatus of such a configuration is sometimes called a "cross stack type measuring apparatus"). Consequently, the following two problems are conceivable.

First, if many light scattering particles, such as dust particles, that scatter light are contained in the gas that flows through the flue, then the laser light emitted from the semiconductor laser may not reach the light receiving device. Thereby, light of a luminous energy sufficient to perform temperature measurement is no longer received at the light receiving device. As a result, the temperature inside the flue can no longer be measured with high accuracy.

Second, the laser light emitted from the semiconductor laser may no longer be received by the light receiving device because, owing to temperature changes in the gas flowing through the flue, the optical path (i.e., the optical axis) of the laser light emitted from the semiconductor laser and/or the light receiving axis of the light receiving device deviate from the states when they were mounted. This is because, for example, owing to temperature changes in the gas flowing through the flue, the sidewalls of the flue, whereto the semiconductor laser, the light receiving device, and the like are attached, and/or a mounting member (e.g., a flange or a casing) deform from their state when mounted.

In particular, because the diameter of the flue is large (on the order of several meters), the laser light emitted from the semiconductor laser is no longer received by the light receiving device owing to even a slight deviation in the optical axis or the light receiving axis. In addition, because the temperature of the gas flowing through the flue is high and also fluctuates dramatically, the flue, the mounting member, and the like tend to deform.

An object of the present invention is to measure, reliably and with high accuracy, the temperature in a prescribed area of a flue wherethrough gas, which is at a high temperature and contains light scattering particles such as dust particles that scatter light, flows.

Technical Solution

A plurality of aspects is explained below as technical solutions. These aspects can be combined arbitrarily as needed.

A thermometer according to one aspect of the present invention comprises an emitting unit, a light receiving unit, a lens unit, and a calculation unit. The emitting unit is configured to emit a measurement light into a flue, wherethrough a gas that contains light scattering particles flows. The light receiving unit is configured to receive, of the measurement light, scattered measurement light scattered by the light scattering particles. The lens unit is provided on the side closer to the flue than the light receiving unit. In addition, the lens unit exists along a light receiving axis. The light receiving axis extends in the normal line direction of a light receiving surface of the light receiving unit. Furthermore, the lens unit is configured to focus at a prescribed position inside the flue and along the light receiving axis. The calculation unit is configured to calculate the temperature inside the flue based on an intensity ratio of absorption spectra at a plurality of wavelengths. Here, the absorption spectra of the specific component in the gas are included in the scattered measurement light received by the light receiving unit. Furthermore, the absorption spectra at the plurality of wavelengths used to calculate the temperature inside the flue are selected from the absorption spectra of a prescribed component.

Here, the absorption spectra refer to the waveforms formed when the wavelength of the measurement light is varied, or refer to the absorption intensities at certain wavelengths.

In the thermometer, the emitting unit first emits measurement light into the flue via, for example, an opening. When the measurement light impinges on the light scattering particles in the gas flowing through the flue, the measurement light is scattered by the light scattering particles. The light of the measurement light scattered by the light scattering particles is called scattered measurement light. Next, the lens unit focuses at a prescribed position inside the flue and along the light receiving axis. Furthermore, the light receiving unit receives the scattered measurement light via the opening. At this time, the majority of the scattered measurement light received at the light receiving unit is light scattered by the light scattering particles between the position at which the measurement light is introduced into the flue and the position inside the flue at which the lens unit focuses. Furthermore, the scattered measurement light is the light that undergoes absorption owing to the gas inside the flue.

Next, the calculation unit selects a plurality of absorption spectra that are included in the scattered measurement light received by the light receiving unit and that was absorbed by the prescribed component in the gas flowing through the flue. Furthermore, the calculation unit calculates the temperature inside the flue based on an intensity ratio of the selected absorption lines.

The light received by the light receiving unit in the thermometer is the scattered measurement light, which was scattered by the light scattering particles contained in the gas flowing through the flue. Thereby, even if the concentration of the light scattering particles, such as dust, is high and the measurement light cannot pass through the flue from one side to the other, the scattered measurement light can be received at the light receiving unit. Accordingly, it is possible to measure the temperature inside the flue wherethrough gas having a high concentration of light scattering particles is flowing.

In addition, the distance from the emitting unit to the light receiving unit can be shortened and the scattered measurement light can be acquired over a wide solid angle. Consequently, even if the temperature of the flue and the sidewall fluctuates, the scattered measurement light can be received at the light receiving unit.

Furthermore, in this thermometer, there is no need to insert a measurement probe or the like into the flue in order to measure the temperature inside the flue. Consequently, the temperature inside the flue can be measured even if a corrosive gas that would adversely corrode the (sheathing of the) thermocouple thermometer is flowing inside the flue.

The absorption spectra may be obtained by scanning the scattered measurement light at wavelengths in a prescribed wavelength band. Thereby, even if the wavelengths output from the light source with respect to the electric current input to the light source varies owing to the usage of the light source over time, the absorption spectra produced by a component in a gas can be obtained reliably.

The emitting unit and the light receiving unit may be provided such that the light receiving axis and a measurement light axis coincide at least inside the flue. The measurement light axis is an optical path of the measurement light. Thereby, the percentage of the scattered measurement light along the measurement light axis received by the light receiving unit increases, which makes it easier to ensure a greater amount of luminous energy of the scattered measurement light that can be received at the light receiving unit.

The emitting unit and the light receiving unit may be provided inside a same casing. Thereby, it is possible to prevent the adverse deviation of a light receiving axis and a measurement light axis caused by a disturbance induced by temperature changes and the like.

The thermometer may further comprise an adjustment unit. The adjustment unit is configured to adjust a center position of the lens unit. Thereby, the lens unit can focus at a desired position inside the flue. As a result, the scattered measurement light can be received by the light receiving unit from the position at which the measurement light is introduced into the flue to the desired position inside the flue at which the lens unit focuses. Thereby, the temperature from the position at which the measurement light is introduced into the flue to the desired position inside the flue at which the lens unit focuses can be measured accurately.

Advantageous Effects of Invention

The present invention can measure, reliably and with high accuracy, the temperature at a prescribed position of a flue wherethrough gas, which is at a high temperature and contains light scattering particles, such as dust particles, that scatter light, flows.

DETAILED DESCRIPTION OF THE INVENTION (1) First Embodiment

1. Configuration of Thermometer 1-1. Overall Configuration

Figure 1:
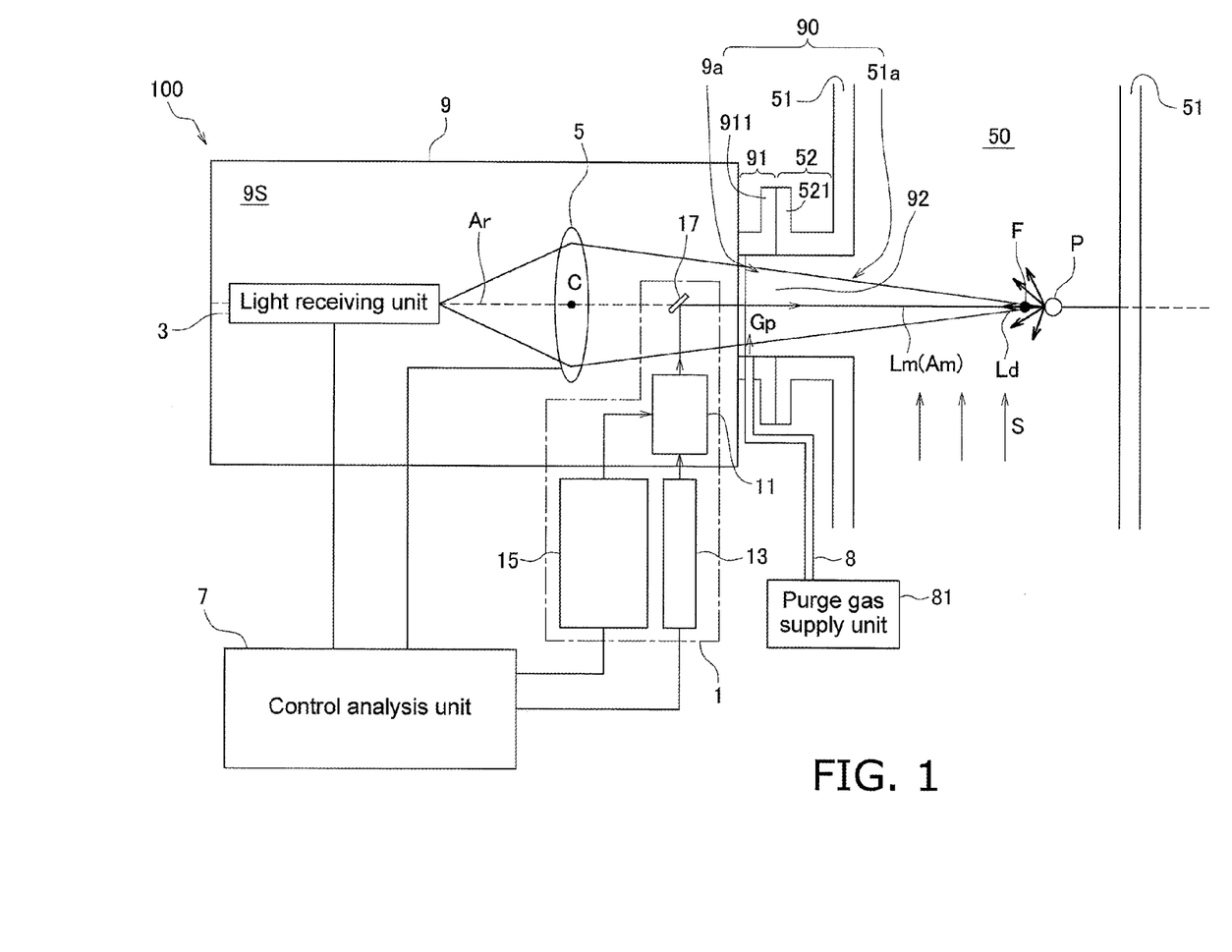
FIG. 1 is a drawing that shows the configuration of a thermometer according to a first embodiment.

The configuration of a thermometer 100 according to the present embodiment will now be explained, referencing FIG. 1. FIG. 1 is a drawing that shows the configuration of the thermometer 100 according to the present embodiment. The thermometer 100 is an apparatus that measures the temperature inside a flue 50 by measuring the temperature of a gas S inside the flue 50, wherethrough the gas S, which contains light scattering particles P, flows. The light scattering particles P are particles that scatter light, for example, fine dust particles, mist water vapor, and the like.

The thermometer 100 comprises an emitting unit 1, a light receiving unit 3, a lens unit 5, and a control analysis unit 7. In addition, the thermometer 100 comprises a purge gas introduction path 8 and a casing 9.

The casing 9 forms the main body of the thermometer 100. Inside a casing space 9S, which is the internal space of the casing 9, the emitting unit 1, the light receiving unit 3, and the lens unit 5 are provided. Thus, providing the emitting unit 1 and the light receiving unit 3 inside the same casing 9 can prevent the adverse deviation of a light receiving axis and a measurement light axis caused by a disturbance induced by temperature changes and the like.

The casing 9 is fixed to part of a sidewall 51 that forms the flue 50. Specifically, the casing 9 is fixed to the sidewall 51 as described below.

In the casing 9, a casing opening 9a is formed, and a casing flange part 91 is formed around the casing opening 9a. Moreover, a sidewall flange part 52 is formed around a sidewall opening 51a. As shown in FIG. 1, a circumferential part 911 of the casing flange part 91 is fixed to a circumferential part 521 of the sidewall flange part 52 such that the circumferential part 911 coincides with the circumferential part 521 of the sidewall flange part 52.

Furthermore, as shown in FIG. 1, in the thermometer 100 of the present embodiment, a measurement probe or the like is not inserted from the thermometer 100 into the flue 50. Consequently, the temperature inside the flue 50 can be measured even if a corrosive gas that would adversely corrode the (sheathing of the) thermocouple thermometer is flowing inside the flue 50.

In addition, as shown in FIG. 1, the casing 9 and the sidewall 51 are fixed such that the sidewall opening 51a, which is provided in the sidewall 51, and the casing opening 9a, which is provided in the casing 9, coincide. As a result, an opening 90, wherethrough light can pass, is formed between the flue 50 and the casing 9. In addition, an optical window 92, wherethrough light can transmit and which spatially separates the casing space 9S and the flue 50, is provided on the casing opening 9a side of the opening 90.

The purge gas introduction path 8 is provided to the casing flange part 91 in order to supply a purge gas $G_P$ to the vicinity of the optical window 92 inside the flue 50. One end of the purge gas introduction path 8 on the side at which the purge gas $G_P$ is supplied is provided such that it does not protrude from a purge gas introduction opening, which is provided in the casing flange part 91, into the flue 50. Furthermore, another end of the purge gas introduction path 8 is connected to a purge gas supply unit 81 such that it can introduce the purge gas $G_P$. Thereby, the purge gas $G_P$ is supplied via the purge gas introduction path 8 to the vicinity of the optical window 92 inside the flue 50. Supplying the purge gas $G_P$ via the purge gas introduction path 8 to the vicinity of the optical window 92 inside the flue 50 can prevent the contamination of the emitting unit 1, the light receiving unit 3, the lens unit 5, and the optical window 92 inside the casing space 9S owing to dust and the like contained in the gas S inside the flue 50.

The emitting unit 1, which is one example of an emitting unit, emits a measurement light $L_m$ from the casing space 9S of the casing 9 into the flue 50 via the opening 90. The measurement light $L_m$ emitted from the emitting unit 1 forms a measurement light axis $A_m$, which is an optical path of the measurement light $L_m$. Furthermore, in the present embodiment, the emitting unit 1 is installed such that the measurement light axis $A_m$ (i.e., a straight line shown with a solid line extending from the emitting unit 1 in FIG. 1 toward the flue 50), which is the optical path of the measurement light $L_m$, is perpendicular to the direction in which the flue 50 extends. However, it is not necessarily perpendicular. Furthermore, the orientation of the sidewall opening 51a is also not necessarily perpendicular to the directions in which the flue 50 extends. For example, the sidewall opening 51a may be oriented in the flow direction (i.e., the downstream direction) of the gas S inside the flue 50. In this case, it is possible to prevent dust and the like contained in the gas S from accumulating in the sidewall flange part 52. Furthermore, the details of the configuration of the emitting unit 1 are discussed later.

The light receiving unit 3 (i.e., one example of a light receiving unit) is disposed such that the measurement light axis $A_m$ and a light receiving axis $A_r$ (i.e., a straight line shown with a dashed line in FIG. 1), which extends from the center of a light receiving surface of the light receiving unit 3 in the normal line direction of the light receiving surface, coincide at least inside the flue 50. Thereby, it is possible to reduce the frequency with which the installation position, the orientation, and the like of the emitting unit 1 and the light receiving unit 3 are adjusted when the temperature inside the flue 50 is being measured.

The light receiving unit 3 receives, via the opening 90, scattered measurement light $L_d$ of the measurement light $L_m$ scattered by the light scattering particles P. Thereby, the percentage of the scattered measurement light $L_d$ along the measurement light axis $A_m$ received by the light receiving unit 3 can increase, which makes it easier to ensure a greater amount of luminous energy of the scattered measurement light $L_d$ that can be received at the light receiving unit 3. In addition, even if the concentration of the light scattering particles P in the gas S flowing through the flue 50 increases and thereby the measurement light $L_m$ cannot pass through the flue 50 completely from one side to the other, the scattered measurement light $L_d$ can be received at the light receiving unit 3. As a result, the temperature inside the flue 50 wherethrough gas having a high concentration of the light scattering particles P is flowing can even be measured based on the scattered measurement light $L_d$ received at the light receiving unit 3.

For the light receiving unit 3, a photodiode, a photomultiplier, and the like can be used, for example. In particular, if a photomultiplier is used, a sufficient electrical signal can be sent to the control analysis unit 7 (discussed later) even if the luminous energy of the scattered measurement light $L_d$ scattered by the light scattering particles P in the gas S flowing through the flue 50 is low (i.e., the scattered measurement light $L_d$ is weak). As a result, the temperature inside the flue 50 can be measured with higher accuracy.

The lens unit 5, which is one example of a lens unit, is provided closer to the flue 50 than is the light receiving unit 3 and farther from the flue 50 than is the emitting unit 1 (i.e., between the emitting unit 1 and the light receiving unit 3). In addition, a center C of the lens unit 5 exists along the light receiving axis $A_r$. Furthermore, a focal point F of the lens unit 5 is set to a prescribed location inside the flue 50 and along the light receiving axis $A_r$.

Figure 2:
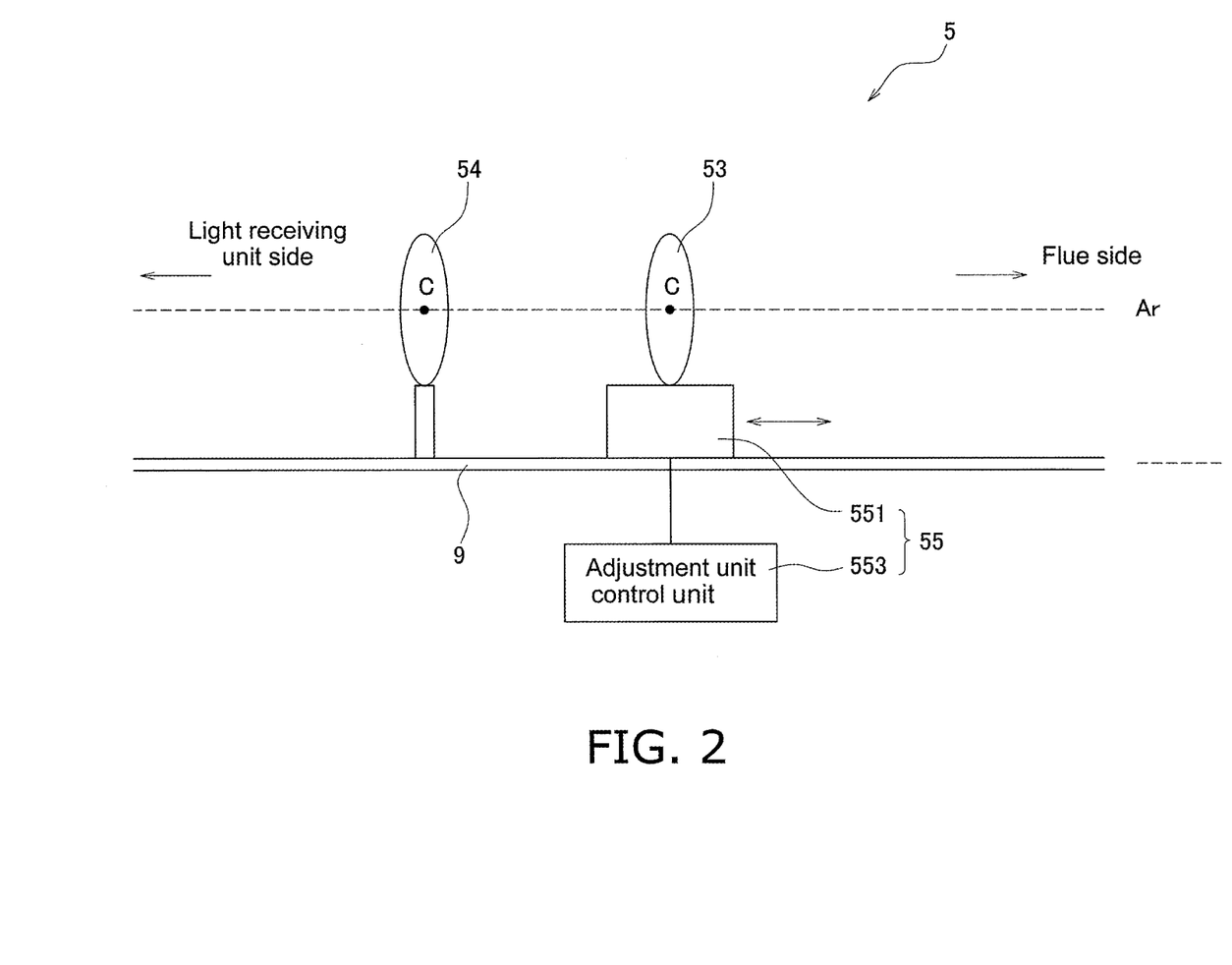
FIG. 2 is a drawing that shows the configuration of lens units of the thermometer according to the first embodiment.

FIG. 2 shows the configuration of the lens unit 5 of the thermometer 100 according to the present embodiment. The lens unit 5 comprises a first lens 53, a second lens 54, and an adjustment unit 55. The first lens 53 focuses the measurement light $L_m$ to a prescribed position inside the flue 50. The second lens 54 is fixed to the casing 9. The second lens 54 focuses the scattered measurement light $L_d$ that enters the thermometer 100 onto the light receiving surface of the light receiving unit 3. By adopting a configuration such that the second lens 54 focuses the scattered measurement light $L_d$ that enters the thermometer 100 onto the light receiving surface of the light receiving unit 3, the scattered measurement light $L_d$ can be received reliably by the light receiving unit 3.

The first lens 53 is fixed to an upper part of the adjustment unit 55. In addition, the adjustment unit 55 comprises a lens unit moving means 551 and an adjustment unit control unit 553. The lens unit moving means 551 moves the center C of the first lens 53 along the light receiving axis $A_r$. Thereby, the lens unit 5 can set the focal point F at a desired position inside the flue 50.

In the thermometer 100, as described above, the scattered measurement light $L_d$, which is the measurement light that was scattered by the light scattering particles P, is received by the light receiving unit 3 via the opening 90, which is the same as the opening 90 wherethrough the measurement light $L_m$ transmitted when travelling into the flue 50. Namely, in the thermometer 100 of the present embodiment, the emitting unit 1, the light receiving unit 3, and the lens unit 5, which form a measurement optical system, are stored in the same casing space 9S of the casing 9. Thereby, even if the temperatures of the flue 50 and the sidewall 51 fluctuate, it is possible to prevent any deviation from the state in which the measurement light axis $A_m$ and the light receiving axis $A_r$ were pre-adjusted. As a result, the measurement light $L_m$ can be received at the light receiving unit 3 even if the temperatures of the flue 50 and the sidewall 51 fluctuate.

In the thermometer 100 of the present embodiment, there are two reasons that the measurement light $L_m$ can be received at the light receiving unit 3 even if the temperatures of the flue 50 and the sidewall 51 fluctuate.

First, even if the mounting angle and the like of the casing 9 change owing to deformation of the sidewall 51 (and/or the sidewall flange part 52), the relative positional relationships among the emitting unit 1, the light receiving unit 3, and the lens unit 5 virtually do not change inside the casing 9.

Second, since the light (i.e., the measurement light $L_m$) that impinges on the light scattering particles P generally scatters with a spread of a certain degree, even if the relative positional relationship between the emitting unit 1 and the light receiving unit 3 deviates in some extent and, as a result, the positional relationship between the measurement light axis $A_m$ and the light receiving axis $A_r$ deviates from its pre-adjusted state, the light receiving unit 3 can still receive the scattered measurement light $L_d$.

The control analysis unit 7 controls the thermometer 100. In particular, it controls the wavelength of the measurement light $L_m$ emitted from the emitting unit 1 and controls the position at which the lens unit 5 focuses, as described above. In addition, a signal output from the light receiving unit 3 is processed based on the intensities of the scattered measurement light $L_d$ received at the light receiving unit 3. Furthermore, the control analysis unit 7 issues control instructions to the thermometer 100 and performs an information process on the signal output from the light receiving unit 3, and the like. The configuration of the control analysis unit 7 is discussed later.

1-2. Configuration of Emitting Unit

Next, the detailed configuration of the emitting unit 1 will be explained, referencing FIG. 1. As discussed above, the emitting unit 1 emits the measurement light $L_m$ into the flue 50 via the opening 90. The emitting unit 1 of the present embodiment comprises a light source 11, a drive unit 13, a temperature control unit 15, and an optical path changing member 17.

The light source 11 generates the measurement light $L_m$. In the present embodiment, the optical path of the measurement light $L_m$ generated by the light source 11 is changed at the optical path changing member 17 (discussed later). The measurement light $L_m$ is then guided into the flue 50. For the light source 11, a semiconductor laser, a quantum cascade laser (QCL), and the like can be used, for example. Thereby, the absorption spectrum peaks (i.e., the signal quantities) produced by a component in the gas S flowing through the flue 50 can be increased. As a result, the resolution of the thermometer 100 can be improved, and thereby the temperature inside the flue 50 can be measured with high accuracy.

Figure 4:
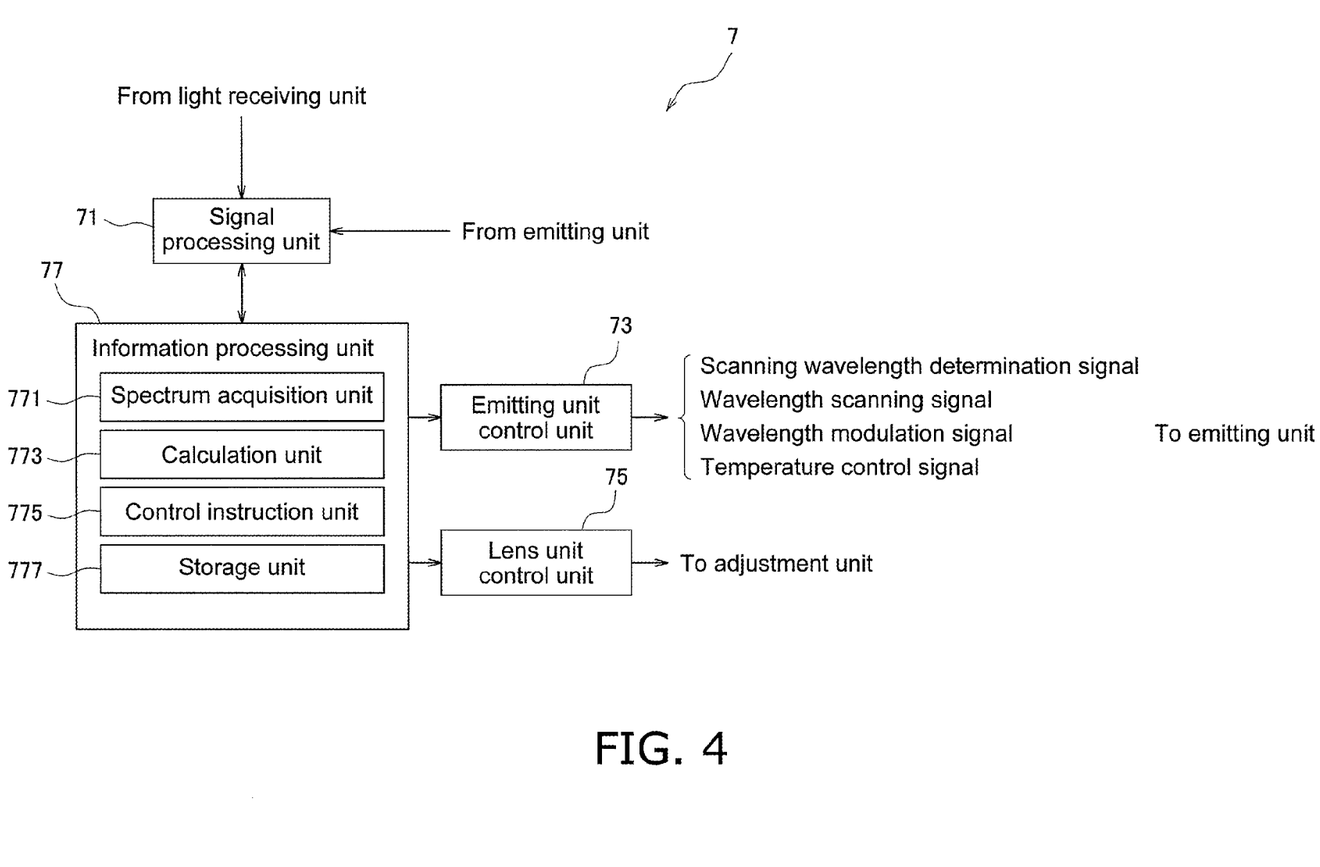
FIG. 4 is a drawing that shows the configuration of a control analysis unit of the thermometer according to the first embodiment.

The temperature control unit 15 adjusts the temperature of the light source 11 based on an instruction from the control analysis unit 7 (FIG. 4). In particular, if a semiconductor laser light source is used as the light source 11, then, even if the drive electric current that drives the light source 11 is constant, the wavelength of the measurement light $L_m$ generated by the light source 11 may change owing to deterioration of the light source 11 and the like, the temperature of the light source 11, and the like. By virtue of the temperature control unit 15 preventing the temperature of the light source 11 from changing, the measurement light $L_m$ can be generated at the same wavelength for the same drive electric current. The temperature control unit 15 can comprise, for example, a thermometer that measures the temperature of the light source 11, and a temperature adjusting means (principally, a cooling means such as an electronic cooling device).

Furthermore, to change the wavelength of the measurement light $L_m$ generated from the light source 11, the temperature control unit 15 may change the temperature of the light source 11. Thereby, the wavelength of the measurement light $L_m$ can be changed without changing the drive electric current supplied to the light source 11.

The optical path changing member 17 guides the measurement light $L_m$, which is generated by the light source 11, into the flue 50. In the present embodiment, the optical path changing member 17 is disposed along the light receiving axis $A_r$. Therefore, it is preferable that the surface area of the optical path changing member 17 is smaller than at least the areas of the lenses of the lens unit 5. This is because if the surface area of the optical path changing member 17 were larger, then the percentage of the scattered measurement light $L_d$ blocked by the optical path changing member 17 would increase, and consequently it would no longer be possible to receive scattered measurement light $L_d$ of sufficient luminous energy at the light receiving unit 3.

For the optical path changing member 17, a beam splitter, a mirror formed of a half-mirror, and the like can be used, for example. Thereby, some of the scattered measurement light $L_d$ can pass through the optical path changing member 17. As a result, the scattered measurement light $L_d$ of a greater amount of luminous energy can be received at the light receiving unit 3.

Figure 3:
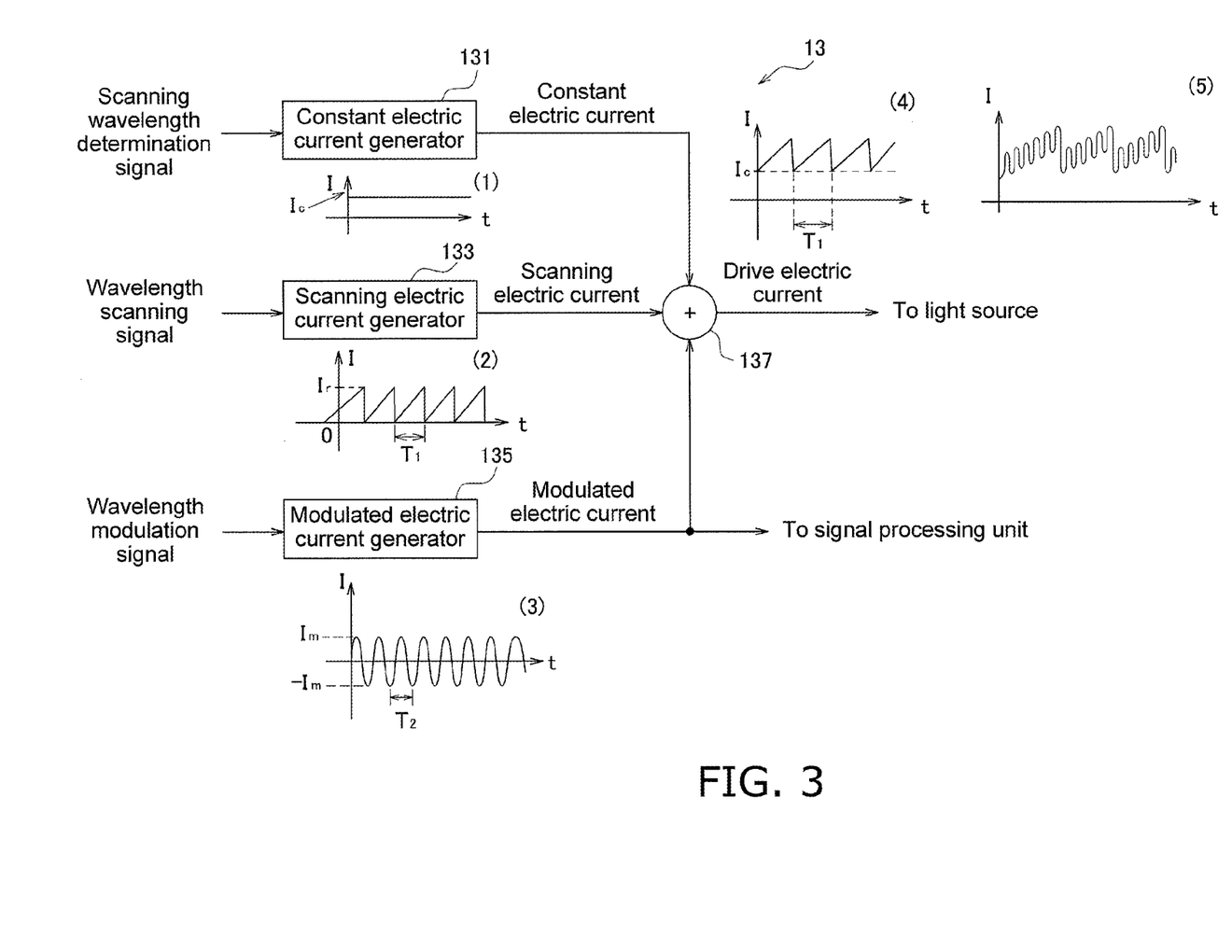
FIG. 3 is a drawing that shows the configuration of a drive unit of the thermometer according to the first embodiment.

The drive unit 13 supplies, to the light source 11, the drive electric current for driving the light source 11. The light source 11 generates the measurement light $L_m$ of a wavelength in accordance with the amplitude of the drive electric current. As shown in FIG. 3, the drive unit 13 principally comprises a constant electric current generator 131. The constant electric current generator 131 generates an electric current ($I_c$) of constant strength (i.e., a constant electric current; refer to waveform (1) in FIG. 3) based on a scanning wavelength determination signal output from an emitting unit control unit 73 (FIG. 4) of the control analysis unit 7. Thereby, the light source 11 can generate the measurement light $L_m$ having a wavelength that accords with the amplitude of the constant electric current generated by the constant electric current generator 131.

Furthermore, in order to obtain an absorption spectrum at a certain wavelength band in the thermometer 100 of the present embodiment, the wavelength of the measurement light $L_m$ is changed by the light source 11. Here, "wavelength band" refers to the range within which the wavelength of the measurement light $L_m$ is changed. Furthermore, in the present embodiment, the wavelength of the measurement light $L_m$ can be changed by changing the drive electric current supplied to the light source 11. In addition, as described above, the wavelength of the measurement light $L_m$ can also be changed by changing the temperature of the light source 11.

In order to change the wavelength of the measurement light $L_m$ based on the drive electric current supplied to the light source 11, the drive unit 13 further comprises a scanning electric current generator 133 and an electric current adder 137. The scanning electric current generator 133 generates an electric current (i.e., a scanning electric current) for scanning the wavelength of the measurement light $L_m$ based on a wavelength scanning signal output from the emitting unit control unit 73 of the control analysis unit 7. In the example shown in FIG. 3, the scanning electric current generator 133 generates a scanning electric current (refer to waveform (2) in FIG. 3) that changes repetitively with a constant scanning period $T_1$, wherein the scanning electric current increases linearly with time from an electric current value of 0 to an electric current value ($I_r$) of a certain prescribed amplitude, and, after the electric current value has increased to the electric current value $I_r$, returns once again to the electric current value of 0 in a time much quicker than the linearly increasing time. The electric current having such a waveform is sometimes called a "ramp wave electric current."

The electric current adder 137 is connected to the constant electric current generator 131 and the scanning electric current generator 133, and inputs the constant electric current generated by the constant electric current generator 131 and the scanning electric current generated by the scanning electric current generator 133. Furthermore, the electric current adder 137 superimposes the scanning electric current on the constant electric current and outputs this superimposed electric current to the light source 11 as the drive electric current. If the scanning electric current generator 133 generates a ramp wave electric current as described above, then a drive electric current as shown in a waveform (4) in FIG. 3 is output from the electric current adder 137. Namely, the ramp wave electric current indicated by the waveform (2) in FIG. 3 has a waveform that is shifted by the amount of the minimum electric current value (constant electric current) $I_c$.

Thereby, during the time $T_1$, the light source 11 can generate the measurement light $L_m$, whose wavelength changes from the wavelength (i.e., the scan minimum wavelength) determined by the minimum electric current value $I_c$ of the ramp wave component superimposed on the constant electric current component, to the wavelength (i.e., the scan maximum wavelength) determined by a maximum current value $I_c+I_r$. Then, the absorption spectrum produced by the component in the gas S flowing through the flue 50 is obtained by measuring a prescribed number of the intensities of the scattered measurement light $L_d$ during the scanning period $T_1$ using the light receiving unit 3.

Furthermore, when the absorption spectrum of the component in the gas S flowing through the flue 50 is measured using wavelength modulation spectroscopy (WMS), the drive unit 13 may further comprise a modulated electric current generator 135. The modulated electric current generator 135 generates a modulated electric current (a sine wave in the case of the waveform (3) in FIG. 3) having a waveform whose amplitude is amplitude $I_m$ and whose period is modulation period $T_2$ (wherein the modulation period $T_2$ is far shorter than the scanning period $T_1$, namely, $T_1 \gg T_2$) based on a wavelength modulation signal output from the emitting unit control unit 73 of the control analysis unit 7. Then, the electric current adder 137 may further superimpose the modulated electric current on the constant electric current and the scanning electric current and output this further-superimposed current as the drive electric current (i.e., a waveform (5) in FIG. 3). Thereby, the light source 11 can generate the measurement light $L_m$ (i.e., wavelength modulation), whose wavelength changes periodically with the modulation period $T_2$ and in a wavelength range determined by the amplitude $I_m$ of the modulated electric current, wherein the center of the change of the wavelength is determined by the constant electric current component and the scanning electric current component in the drive electric current.

1-3. Configuration of Control Analysis Unit

Next, the configuration of the control analysis unit 7 will be explained, referencing FIG. 4. FIG. 4 is a schematic drawing that shows the configuration of the control analysis unit 7. The control analysis unit 7 comprises a signal processing unit 71, the emitting unit control unit 73, a lens unit control unit 75, and an information processing unit 77.

The signal processing unit 71 converts the signal (i.e., the detection signal) based on the intensity of the scattered measurement light $L_d$ output from the light receiving unit 3 to a signal that can be processed by the information processing unit 77. Furthermore, when the absorption spectrum of the component in the gas S that flows through the flue 50 is measured using wavelength modulation spectroscopy as discussed above, then the signal processing unit 71 may comprise a lock-in amplifier 711, a multiplier 713, and a low pass filter 715, as shown in FIG. 5.

Figure 5:
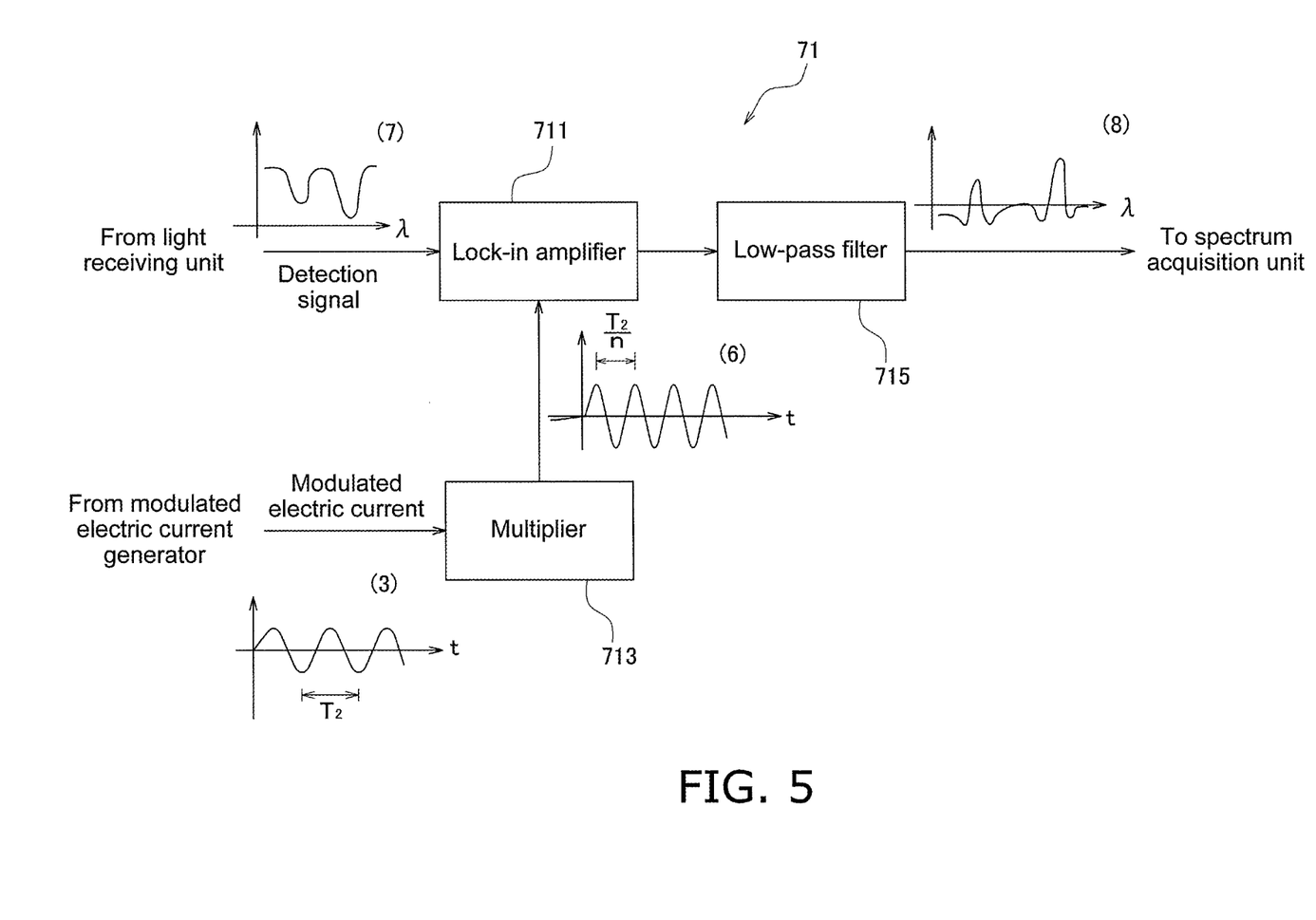
FIG. 5 is a drawing that shows the configuration of a signal processing unit of the thermometer according to the first embodiment.

The multiplier 713 inputs the modulated electric current output from the modulated electric current generator 135 of the drive unit 13 of the emitting unit 1, and, based on the inputted modulated electric current, generates a signal (i.e., a reference signal; refer to waveform (6) in FIG. 5) that has a frequency that is n times the modulation frequency ($1/T_2$) of the modulated electric current (i.e., with a period of $1/n$ times the modulation period $T_2$, namely, $T_2/n$). The lock-in amplifier 711 performs signal processing that multiplies the reference signal output from the multiplier 713 by the detection signal output from the light receiving unit 3, and outputs that processed signal. The low pass filter 715 inputs the multiplied signal output from the lock-in amplifier 711, and outputs only the direct current component of the processed signal.

The signal processing unit 71 configured in this manner can extract, from the detection signal output from the light receiving unit 3 (i.e., a spectrum (7) in FIG. 5), an nth order harmonic component of the detection signal (i.e., a spectrum (8) in FIG. 5). Such an nth order harmonic component includes a differential component of the detection signal; consequently, even if the detection signal is weak (i.e., the luminous energy of the scattered measurement light $L_d$ is low) or if the detection signal contains noise and the S/N ratio is low, the absorption spectrum of the component in the gas S flowing through the flue 50 can still be acquired with little error. As a result, the temperature inside the flue 50 can be measured with high accuracy based on the absorption spectrum.

The emitting unit control unit 73 outputs, to the emitting unit 1, signals (i.e., the scanning wavelength determination signal, the wavelength scanning signal, the wavelength modulation signal, and a temperature control signal) for controlling the emitting unit 1 based on an instruction of a control instruction unit 775 (discussed later) of the information processing unit 77. The scanning wavelength determination signal determines a sweep starting wavelength that is used when the wavelengths of the measurement light $L_m$ are being scanned. This signal is input to the constant electric current generator 131 of the drive unit 13 of the emitting unit 1. The wavelength scanning signal is a signal for scanning the wavelengths of the measurement light $L_m$. Accordingly, the wavelength scanning signal is input to the scanning electric current generator 133 of the drive unit 13. The wavelength modulation signal is a signal that modulates the wavelength of the measurement light $L_m$ when the absorption spectrum is being measured using wavelength modulation spectroscopy. Accordingly, the wavelength modulation signal is input to the modulated electric current generator 135 of the drive unit 13. The temperature control signal is a signal for controlling the temperature of the light source 11. Accordingly, the temperature control signal is input to the temperature control unit 15 of the emitting unit 1.

The lens unit control unit 75 transmits, to the adjustment unit 55, a signal for controlling the position of (the center C of) the lens unit 5. Thereby, it is possible to control the position at which the focal point F is set by the lens unit 5 inside the flue 50.

The information processing unit 77 controls and instructs the thermometer 100 and performs information processing on the data acquired based on the scattered measurement light $L_d$. The information processing unit 77 is, for example, a computer for performing information processing. In addition, the information processing unit 77 may comprise an interface, which comprises an A/D converter and the like, for exchanging signals among the signal processing unit 71, the emitting unit control unit 73, and the lens unit control unit 75 of the control analysis unit 7.

The information processing unit 77 comprises a spectrum acquisition unit 771, a calculation unit 773, the control instruction unit 775, and a storage unit 777. Furthermore, the functions of each unit of the information processing unit 77 may be implemented as programs that can be executed by the information processing unit 77. In addition, these programs may be stored in a storage area of the information processing unit 77 (i.e., a storage area that includes the storage unit 777).

The spectrum acquisition unit 771 (i.e., one example of a spectrum acquisition unit), from the detection signal processed by the signal processing unit 71, acquires data (corresponding to the absorption spectrum) that describe the relationship between the wavelength of the scattered measurement light $L_d$ and the luminous energy (i.e., the intensity) of the scattered measurement light $L_d$.

The calculation unit 773 (i.e., one example of a calculation unit) selects two absorption spectra from the data (i.e., the absorption spectra) acquired by the spectrum acquisition unit 771, and derives the intensity ratio of the two absorption spectra. Furthermore, the temperature inside the flue 50 is calculated based on the relationship between the intensity ratio of the two absorption spectra and the temperature. Here, the number of absorption lines selected may be three or more.

The control instruction unit 775 performs various settings for controlling the thermometer 100. Furthermore, the control instruction unit 775 instructs each constituent element of the control analysis unit 7 to transmit control signals to the thermometer 100, based on those settings, and as needed. Consequently, the control instruction unit 775 also has a function that accepts input from an input apparatus (not shown) of the information processing unit 77.

The storage unit 777 stores information required to measure the temperature inside the flue 50 based on the scattered measurement light $L_d$, such as various settings for controlling the thermometer 100, the relationship between the temperature and the intensity ratio of the two absorption spectra of a specific component in the gas S, and the like.

Furthermore, the relationship between the temperature and the intensity ratio of the two absorption spectra of the specific component in the gas S is stored in the storage unit 777 as a function that expresses the relationship between the temperature and the intensity ratio of the two absorption spectra. In addition, the relationship between the temperature and the intensity ratio of the two absorption spectra may be stored in the storage unit 777 as a table.

2. Measurement of Temperature Inside the Flue by the Thermometer

Next, a method of measuring the temperature inside the flue 50 using the thermometer 100 of the present embodiment will be explained. In the present embodiment, the temperature inside the flue 50 is measured based on the absorption spectrum of oxygen, moisture, or carbon dioxide inside the flue 50. This is because the gas S flowing through the flue 50 contains a high concentration of oxygen, moisture, carbon dioxide, and the like. In addition, another reason is that the absorption coefficient of oxygen, moisture, carbon dioxide, and the like is high. Thereby, it is possible to obtain an absorption spectrum of sufficient intensity. As a result, the temperature inside the flue 50 can be measured with high accuracy.

In addition, in the present embodiment, the calculation of the temperature inside the flue 50 is performed based on a second order harmonic component of the absorption spectrum of the component in the gas S, which was obtained from the detection signal based on the intensity of the scattered measurement light $L_d$ using the wavelength modulating method.

First, the emitting unit 1 emits, into the interior of the flue 50, the measurement light $L_m$ of a wavelength that is tuned to the absorption spectrum of oxygen, moisture, carbon dioxide, or the like inside the flue 50. The measurement light $L_m$ is subject to wavelength modulation based on the wavelength modulation signal output from the emitting unit control unit 73 of the control analysis unit 7. Specifically, the wavelength of the measurement light $L_m$ is modulated based on the modulated electric current component in the drive electric current.

Next, the lens unit 5 sets its focal point F at a prescribed position inside the flue 50. At this time, the lens unit control unit 75 adjusts the position of the center C of the lens unit 5 such that the focal point F is set in a prescribed area inside the flue 50 at which the temperature is to be measured.

Here, the prescribed area inside the flue 50 at which the temperature is to be measured is conceivably, for example, an area that is determined based on the intensity of the scattered measurement light $L_d$, an area that is determined based on the concentration of the light scattering particles P inside the flue 50, and the like.

The scattered measurement light $L_d$ of a sufficient luminous energy can be received at the light receiving unit 3 by setting the focal point F in an area that is determined based on the intensity of the scattered measurement light $L_d$. As a result, the temperature inside the flue 50 can be measured with high accuracy based on the absorption spectrum of a component (e.g., oxygen, moisture, carbon dioxide, or the like) in the gas S flowing through the flue 50.

Figure 6A:
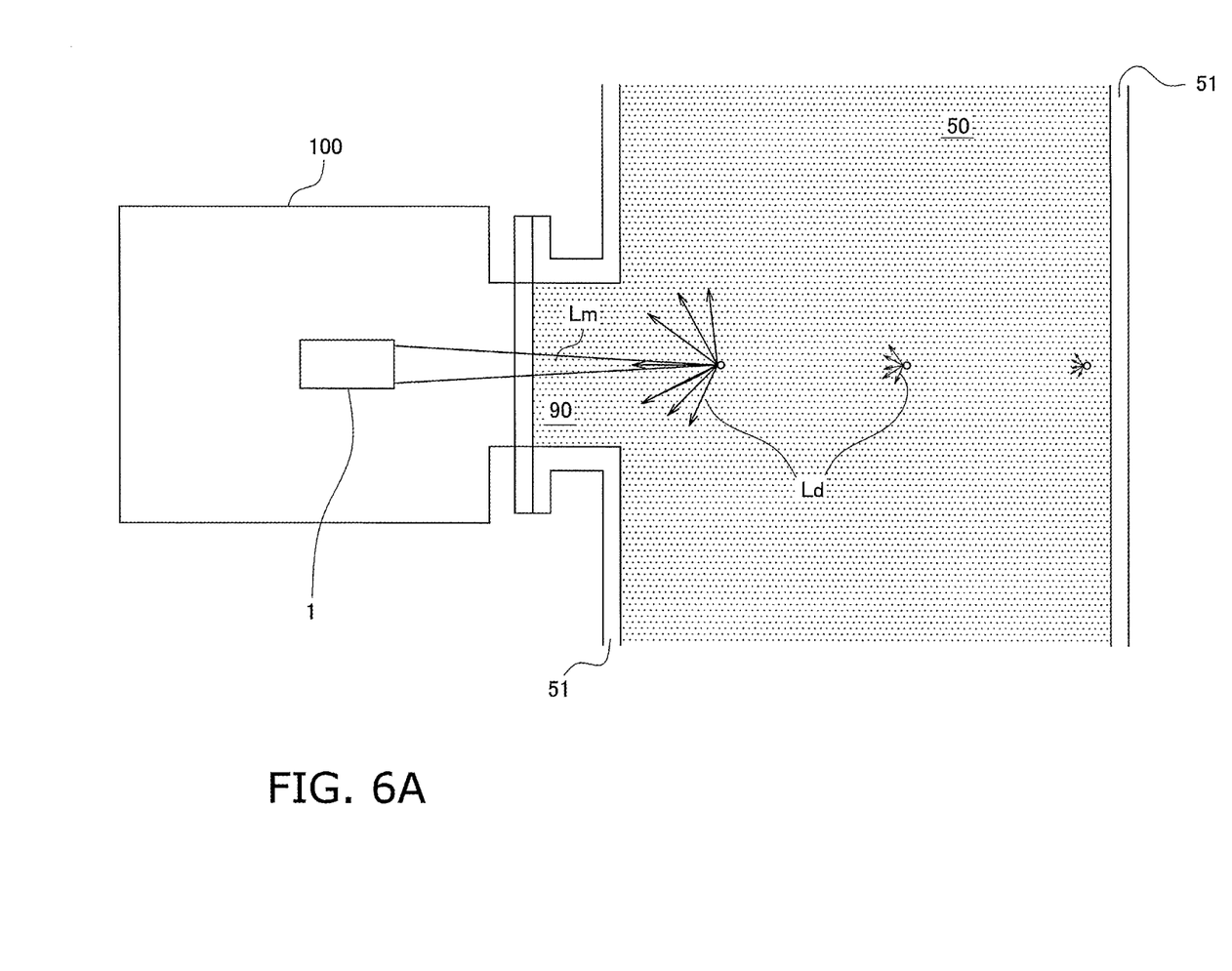
FIG. 6A is a schematic drawing of an aspect of a measurement light and scattered measurement light for the case wherein the concentration of light scattering particles contained in a gas flowing through a flue is high.
Figure 6B:
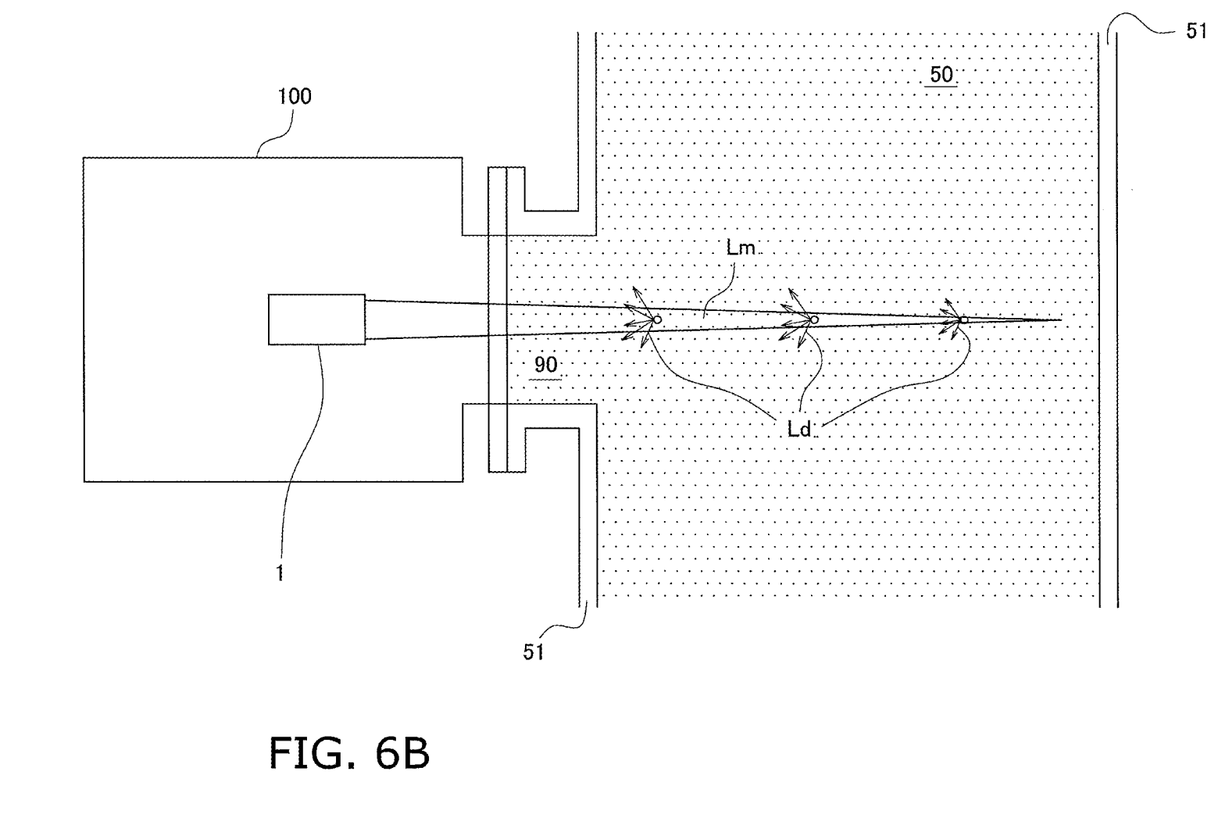
FIG. 6B is a schematic drawing that shows an aspect of the measurement light and the scattered measurement light for the case wherein the concentration of light scattering particles contained in the gas flowing through the flue is low.

Moreover, setting the focal point F in the area determined based on the concentration of the light scattering particles P inside the flue 50 is advantageous for the case wherein the intensity of the scattered measurement light $L_d$ at the prescribed position inside the flue 50 varies with the concentration of the light scattering particles P inside the flue 50. Namely, as shown in FIG. 6a, if the concentration of the light scattering particles P inside the flue 50 is high, then virtually all of the measurement light $L_m$ will adversely be scattered at a position close to the opening 90 inside the flue 50. Accordingly, in order to receive the scattered measurement light $L_d$ of a sufficient intensity, the position of the focal point F is set on the position inside the flue 50 before the area where the measurement light $L_m$ can reach.

Thereby, the scattered measurement light $L_d$ from the position at which the measurement light $L_m$ is introduced into the flue 50 up to an appropriate position inside the flue 50 that is determined based on the concentration of the light scattering particles P can be received at the light receiving unit 3. As a result, the temperature inside the flue 50 can be measured with high accuracy based on the absorption spectrum of the component (i.e., oxygen, moisture, carbon dioxide, or the like) in the gas S flowing through the flue 50.

The absorption spectrum of oxygen, moisture, carbon dioxide, or the like inside the flue 50 is acquired as follows.

First, the wavelengths of the measurement light $L_m$ are scanned in a prescribed wavelength range. The scanning of the wavelengths of the measurement light $L_m$ is performed based on a scanning electric current component, within the drive electric current of the light source 11, that is output from the scanning electric current generator 133 of the drive unit 13 of the emitting unit 1. In the example shown in FIG. 3, the wavelength of the measurement light $L_m$ varies nonlinearly with respect to time during the scanning period $T_1$ from the scan minimum wavelength determined by the minimum electric current value $I_c$ to the scan maximum wavelength determined by the maximum current value $I_c+I_r$.

Subsequently, the spectrum acquisition unit 771 acquires the absorption spectrum of oxygen, moisture, carbon dioxide, or the like in the gas S flowing through the flue 50, after which the calculation unit 773 selects two prescribed absorption lines of the absorption spectrum and calculates the temperature inside the flue 50 based on the intensity ratio of the two selected absorption lines.

Figure 7:
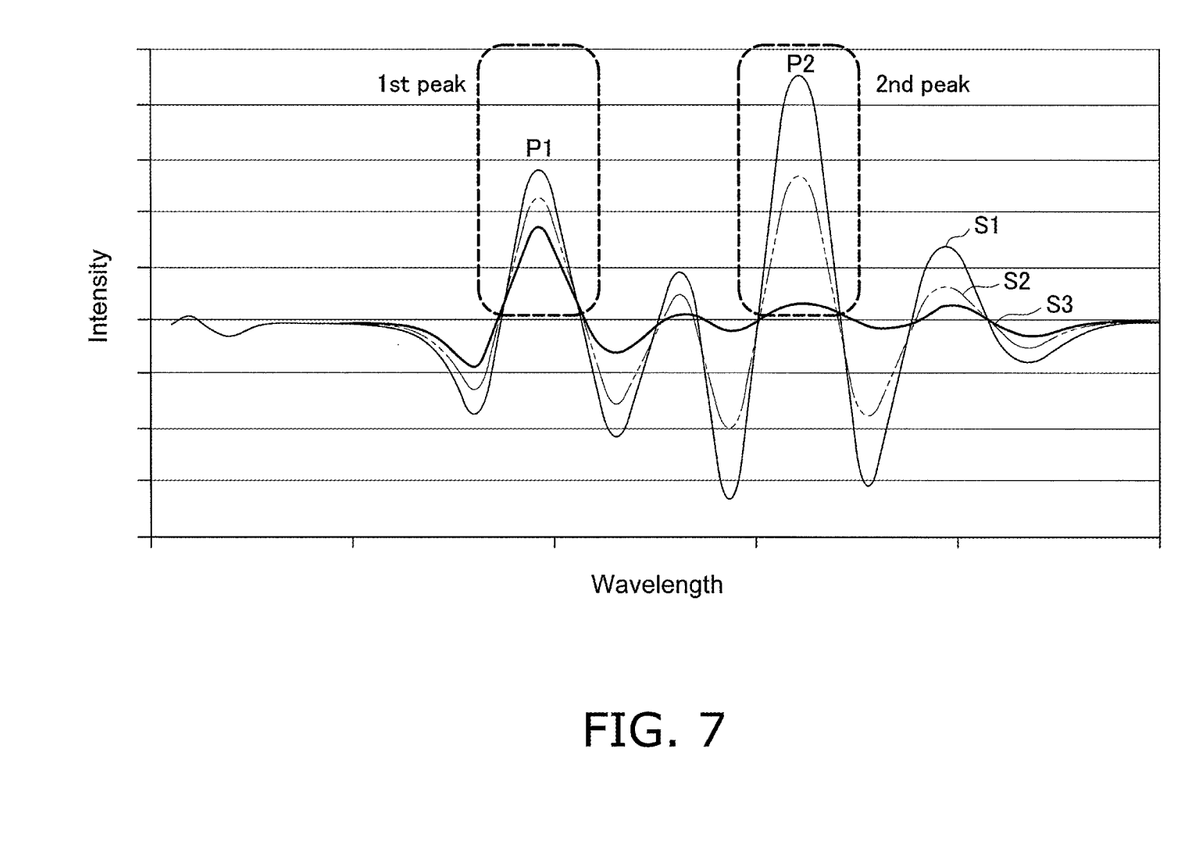
FIG. 7 is a graph that shows the temperature dependency of absorption spectra of a component contained in the gas flowing through the flue.

In the absorption spectra shown in FIG. 7, as the temperature inside the flue 50 increases, the absorption spectra change in the order of an absorption spectrum S3 (a spectrum indicated by a thick solid line), an absorption spectrum S2 (a spectrum indicated by a chain double dashed line), and an absorption spectrum S1 (a spectrum indicated by a thin solid line). Here, looking at the first absorption spectra in FIG. 7 (i.e., the absorption spectra described by the "1st peak" frame in FIG. 7) and the second absorption spectra (i.e., the absorption spectra described by the "2nd peak" frame), the change in the intensities of the second absorption spectra with respect to temperature is greater than that of the first absorption spectra.

Accordingly, an intensity ratio (P2/P1) of an intensity P2 of the second absorption spectra with respect to an intensity P1 of the first absorption spectra also varies with the temperature. Furthermore, because the intensity ratio is a value that is relative to the intensities of the absorption spectrum, it does not change even if the intensity of the entire absorption spectrum changes owing to a change in the intensities of the scattered measurement light $L_d$. Thereby, the temperature inside the flue 50 can be measured accurately even if the scattered measurement light $L_d$ changes owing to the change in the concentration of the light scattering particles P in the gas S flowing through the flue 50 changes (during the measurement of the temperature inside the flue 50).

The selection of the two absorption spectra of the absorption spectrum of oxygen, moisture, carbon dioxide, or the like in the gas S flowing through the flue 50, should be determined in accordance with the temperature range inside the flue 50 to be measured. Furthermore, the temperature range to be measured and the two selected absorption spectra (the wavelengths at which these two selected absorption spectra appear) may be associated and stored in the storage unit 777. In this case, the calculation unit 773 first compares the measurement temperature range, which was set by the control instruction unit 775, and the temperature range to be measured, which is stored in the storage unit 777. Furthermore, the calculation unit 773 selects the temperature range to be measured, which is included in the set measurement temperature range, and determines the (wavelengths at which arise the) two selected absorption spectra associated with the temperature range to be measured, which is stored in the storage unit 777.

(2) Other Embodiments

The above described one embodiment of the present invention, but the present invention is not limited to the abovementioned embodiment, and it is understood that variations and modifications may be effected without departing from the spirit and scope of the invention. In particular, a plurality of the embodiments and modified examples described in the present specification can be arbitrarily combined as needed.

(A) Other Embodiments Relating to the Arrangement of the Emitting Unit and the Light Receiving Unit In the thermometer 100 of the first embodiment, the emitting unit 1 and the light receiving unit 3 are provided such that the light receiving axis $A_r$ and the measurement light axis $A_m$ coincide at least inside the flue 50. In addition, the emitting unit 1 is provided such that the measurement light axis $A_m$ is perpendicular to the directions in which the flue 50 extends. However, the arrangements of the emitting unit 1 and the light receiving unit 3 are not limited thereto.

Figure 8:
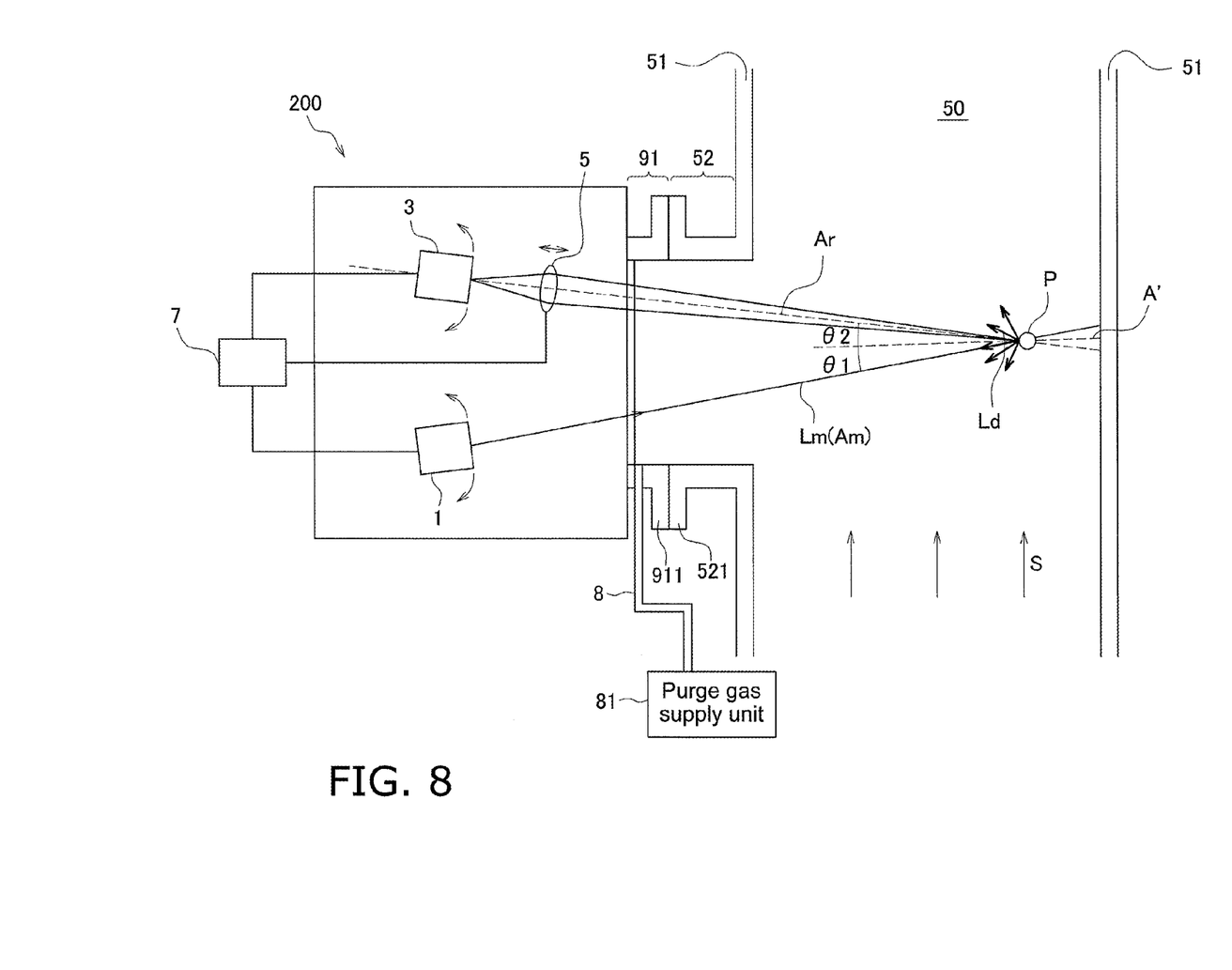
FIG. 8 is a drawing that shows the configuration of the thermometer according to another embodiment.

As in a thermometer 200 shown in FIG. 8, the emitting unit 1 may be provided in the thermometer 200 such that the measurement light axis $A_m$ forms a prescribed angle $\theta_1$ with respect to an axis A', which is perpendicular to the directions in which the flue 50 extends. In addition, the light receiving unit 3 may be provided in the thermometer 200 such that the light receiving axis $A_r$ forms a prescribed angle $\theta 2$ with respect to the axis A'.

Since the scattered measurement light $L_d$, which is the measurement light that was scattered by the light scattering particles P, is scattered with a certain degree of spread, the scattered measurement light $L_d$ can be received at the light receiving unit 3 even if the light receiving axis $A_r$ and the measurement light axis $A_m$ do not coincide, as shown in FIG. 8.

In addition, in the thermometer 200 shown in FIG. 8, there are no members, other than the lens unit 5, on the side of the light receiving unit 3 closer to the flue 50. Thereby, the scattered measurement light $L_d$ is not blocked by any member that would block the light.

Moreover, in the thermometer 200 shown in FIG. 8, the emitting unit 1 and the light receiving unit 3 may be mounted such that they can rotate about the axes that pass through the centers of the emitting unit 1 and the light receiving unit 3, respectively, and that are perpendicular to the directions in which the flue 50 extends (i.e., in directions perpendicular to the paper surface in FIG. 8). In this case, the light receiving unit 3 and the lens unit 5 may be mounted on a common fixed block (not shown), which can rotate about axes that are perpendicular to the directions in which the flue 50 extends (i.e., in directions perpendicular to the paper surface of FIG. 8).

Thereby, the angles $\theta_1$ and $\theta_2$ can be set to desired angles. As a result, the scattered measurement light $L_d$ can be measured at a desired position inside the flue 50. Thereby, the temperature at the desired position inside the flue 50 can be measured.

In addition, the angles $\theta_1$ and $\theta_2$ may be set such that they are both the same angle. Thereby, the scattered measurement light $L_d$ of greater strength can be received at the light receiving unit 3. This is because the intensity of the scattered measurement light $L_d$ scattered at the angle $\theta_2$ tends to be stronger when the angle $\theta_2$ corresponds to the angle of incidence $\theta_1$ at which the measurement light $L_m$ impinges on the light scattering particles P.

(B) Another Embodiment Related to the Lens Unit

In the thermometer 100 of the first embodiment, two lenses (i.e., the first lens 53 and the second lens 54) are provided to the lens unit 5. However, the number of lenses provided to the lens unit 5 is not limited thereto. For example, the number of the lenses provided to the lens unit 5 may be one. If just one lens is provided to the lens unit 5, then that lens may be provided to the casing 9, which is capable of being moved along the light receiving axis $A_r$ by the adjustment unit 55.

In addition, the lens may be fixed to the casing 9, particularly in cases wherein the position at which the focal point F is set is determined in advance. If the lens is fixed to the casing 9, then the lens may be disposed at the position at which the lens is focused on the light receiving unit 3. By virtue of the lens being fixed to the casing 9, the distance from the lens to the light receiving unit 3 no longer deviates. Consequently, the scattered measurement light $L_d$ can always be focused on the light receiving surface of the light receiving unit 3. As a result, the scattered measurement light $L_d$ can be received at the light receiving unit 3 reliably.

INDUSTRIAL APPLICABILITY

The thermometer according to the present invention can be widely applied to thermometers that measure the temperature inside a flue based on an absorption spectrum of a gas that flows through a flue.

REFERENCE CHARACTER LIST 100, 200 Thermometer
1 Emitting unit
11 Light source
13 Drive unit
131 Constant electric current generator
133 Scanning electric current generator
135 Modulated electric current generator
137 Electric current adder
15 Temperature control unit
17 Optical path changing member
3 Light receiving unit
5 Lens unit
53 First lens
54 Second lens
55 Adjustment unit
551 Lens unit moving means
553 Adjustment unit control unit
7 Control analysis unit
71 Signal processing unit
711 Lock-in amplifier
713 Multiplier
715 Low pass filter
73 Emitting unit control unit
75 Lens unit control unit
77 Information processing unit
771 Spectrum acquisition unit
773 Calculation unit
775 Control instruction unit
777 Storage unit
8 Purge gas introduction path
81 Purge as supply unit
9 Casing
9a Casing opening
9S Casing space
90 Opening
91 Casing flange part
92 Optical window
911 Circumferential part
50 Flue
51 Sidewall
51a Sidewall opening
52 Sidewall flange part
521 Circumferential part
A' Axis perpendicular to the directions in which the flue extends
$A_m$ Measurement light axis
$A_r$ Light receiving axis
C Center of lens unit
F Focal point
$G_P$ Purge gas
$L_d$ Scattered measurement light
$L_m$ Measurement light
P Light scattering particles
P1 Intensity of first absorption spectrum
P2 Intensity of second absorption spectrum
S Gas
S1, S2, S3 Absorption spectra
$\theta_1$ Angle formed between the measurement light axis and the axis perpendicular to the directions in which the flue extends
$\theta_2$ Angle formed between the light receiving axis and the axis perpendicular to the directions in which the flue extends

What is claimed is:

1. A thermometer, comprising:
an emitting unit configured to emit a measurement light along a measurement light axis into a flue, wherethrough a gas that contains light scattering particles flows, wherein the measurement light axis is formed between the emitting unit and the flue;
a light receiving unit configured to receive, of the measurement light, scattered measurement light scattered by the light scattering particles, wherein a wavelength of the emitted measurement light is the same as a wavelength of scattered measurement light after scattering by the light scattering particles;
a light collecting unit provided on a side closer to the flue than the light receiving unit, existing along a light receiving axis, and configured to collect the scattered measurement light existing on the light receiving axis, the light receiving axis extending between the light receiving unit and the prescribed position inside the flue, wherein either the light receiving axis and the measurement light axis coincide at least inside the flue, or the light receiving axis and the measurement light axis are formed at a first prescribed angle and a second prescribed angle, respectively, the first prescribed angle and the second prescribed angle being angles relative to an axis perpendicular to an extending direction of the flue, and the second prescribed angle being different from the first prescribed angle; and a calculation unit configured to calculate the temperature inside the flue based on an intensity ratio of absorption spectra at a plurality of wavelengths, wherein the absorption spectra at the plurality of wavelengths are selected among absorption spectra of a prescribed component in the gas and included in the scattered measurement light received by the light receiving unit.

2. The thermometer according to claim 1, wherein the absorption spectra are obtained by scanning the scattered measurement light at wavelengths in a prescribed wavelength band.

3. The thermometer according to claim 1, wherein the emitting unit and the light receiving unit are provided such that the light receiving axis and a measurement light axis coincide at least inside the flue, the measurement light axis being an optical path of the measurement light.

4. The thermometer according to claim 1, wherein the emitting unit and the light receiving unit are provided inside a same casing.

5. The thermometer according to claim 1, further comprising an adjustment unit configured to adjust a center position of the light collecting unit.

6. A thermometer, comprising:

an emitting unit configured to emit a measurement light along a measurement light axis into a flue, wherethrough a gas that contains light scattering particles flows, wherein the measurement light axis is formed between the emitting unit and the flue;

a light receiving unit configured to receive, of the measurement light, scattered measurement light scattered by the light scattering particles along a light receiving axis, wherein a wavelength of the emitted measurement light is the same as a wavelength of scattered measurement light after scattering by the light scattering particles, and wherein either the light receiving axis and the measurement light axis coincide at least inside the flue, or the light receiving axis and the measurement light axis are formed at a first prescribed angle and a second prescribed angle, respectively, the first prescribed angle and the second prescribed angle being angles relative to an axis perpendicular to an extending direction of the flue, and the second prescribed angle being different from the first prescribed angle; and a calculation unit configured to calculate the temperature inside the flue based on an intensity ratio of absorption spectra at a plurality of wavelengths, wherein the absorption spectra at the plurality of wavelengths are selected among absorption spectra of a prescribed component in the gas and included in the scattered measurement light received by the light receiving unit.

\* \* \* \* \*